(12) United States Patent
Thill

(10) Patent No.: US 10,268,944 B2
(45) Date of Patent: Apr. 23, 2019

(54) DUAL-INTERFACE PAYMENT DEVICE WITH DISPLAY

(71) Applicant: GEMALTO SA, Meudon (FR)

(72) Inventor: Michel Thill, Meudon (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 15/105,561

(22) PCT Filed: Dec. 3, 2014

(86) PCT No.: PCT/EP2014/076341
§ 371 (c)(1),
(2) Date: Jun. 16, 2016

(87) PCT Pub. No.: WO2015/090955
PCT Pub. Date: Jun. 25, 2015

(65) Prior Publication Data
US 2016/0321533 A1 Nov. 3, 2016

(30) Foreign Application Priority Data

Dec. 17, 2013 (EP) .................................... 13306749

(51) Int. Cl.
*G06K 19/077* (2006.01)
*G06K 19/07* (2006.01)

(52) U.S. Cl.
CPC ... *G06K 19/07769* (2013.01); *G06K 19/0705* (2013.01); *G06K 19/07707* (2013.01); *G06K 19/07709* (2013.01)

(58) Field of Classification Search
CPC ......... G06K 17/0705; G06K 19/07707; G06K 19/07709
See application file for complete search history.

(56) References Cited

U.S. PATENT DOCUMENTS 6,593,845 B1 * 7/2003 Friedman ........... G06K 19/0701
340/10.1
7,728,713 B2 * 6/2010 Stewart .............. G06K 19/0723
257/312
(Continued)

FOREIGN PATENT DOCUMENTS

WO WO02071328 A1 9/2002
WO WO2009063386 A1 5/2009

OTHER PUBLICATIONS

PCT/EP2014/076341, International Search Report, dated Feb. 12, 2015, European Patent Office, P.B. 5818 Patentlaan 2 NL—2280 HV Rijswijk.
(Continued)

*Primary Examiner* — Thien M Le
*Assistant Examiner* — Asifa Habib
(74) *Attorney, Agent, or Firm* — The Jansson Firm; Pehr B. Jansson

(57) ABSTRACT

The invention relates to a payment device 100 comprising a secure integrated circuit SE with a dual interface. A connector 110 is connected to the contact type interface in order to communicate with an external reader. An antenna 140 is connected to the contactless interface. The device also comprises a reader circuit 120, 130, 150 compatible with the secure integrated circuit SE, wherein the reader circuit is connected in parallel to the connector 110. An independent battery BAT is used to power the reader circuit. A power switching circuit 160 connected to a communication field detection circuit 170, wherein said power switching circuit is capable of powering the reader circuit after a communication field is detected.

27 Claims, 4 Drawing Sheets

(56) References Cited

U.S. PATENT DOCUMENTS

| | | | |
|---|---|---|---|
| 2003/0019942 A1 | 1/2003 | Blossom | |
| 2009/0137276 A1* | 5/2009 | Baldischweiler | G06F 3/0617 |
| | | | 455/558 |
| 2009/0164380 A1* | 6/2009 | Brown | G06Q 20/341 |
| | | | 705/65 |
| 2010/0277282 A1* | 11/2010 | Kang | H04B 5/0037 |
| | | | 340/10.1 |
| 2010/0327945 A1 | 12/2010 | Caruana et al. | |
| 2014/0015822 A1* | 1/2014 | Hu | H02J 7/0055 |
| | | | 345/212 |

OTHER PUBLICATIONS

PCT/EP2014/076341, Written Opinion of the International Searching Authority, dated Feb. 12, 2015, European Patent Office, P.B. 5818 Patentlaan 2 NL—2280 HV Rijswijk.

\* cited by examiner

DUAL-INTERFACE PAYMENT DEVICE WITH DISPLAY

BACKGROUND

1. Field of the Invention

The invention relates to a dual-interface payment device with a display. More particularly, it relates to a use of this type of payment device in contactless mode with a high level of security.

2. Description of the Related Art

'Dual-interface payment device' particularly refers to smart cards with two interfaces that further have a display and keypad. Even though a smart card has been used as an example in its description, the payment device according to the invention is not limited to a credit card format and could for example be a similar portable device such as a USB stick with a contactless interface; in such a case, the ISO 7816 interface described in this application would be replaced by a USB interface.

Commonly used dual-interface cards are cards with a contactless communication interface and a contact type communication interface. Smart cards are commonly used with secure readers in order to use a transaction authorisation code. The operation remains fully secure providing the reader is a certified reader.

Smart cards with displays have been known for a very long time. However, in order to retain the security of the secure microchip of the smart card, the separation of the secure transaction and display functions is known. To that end, the application EP2577568 reveals a smart card with an integrated card reader that makes it possible to retain the full integrity of the secure microchip that carries out transactions, while allowing interaction with it to display information from that secure microchip. The reader integrated in the card happens to be a reader that has been made 'secure' for the card bearer; only the card bearer has access to it and the reader does not access an external network.

In terms of electronic transactions, the performance of transactions that are not fully secure for practical reasons is known. Some transactions for small amounts do not involve a verification of the card authorisation code. In such cases, fraud is limited by the small amount of the transaction.

The development of smart telephones with advanced browsers and contactless communication interfaces compatible with smart cards (ISO14443) makes it possible to secure Internet transactions by means of smart card payment using an authorisation code. However, the mobile telephones are not secured. Indeed, mobile telephones are open communication systems that can receive new applications and particularly malicious applications that can intercept what is displayed on the screen or enter into the keypad or the touch screen. This type of malicious application can thus steal the authorisation code, which can then be used subsequently after the card is stolen.

In order to remedy the aforementioned drawback, the international application filed on 11 Jul. 2014 under no. PCT/EP2014/064909 discloses a contactless transaction method with a display card in which a first contactless exchange sends a request for a transaction with the desired amount to the secure microchip from a telephone (or another non-certified reader). Once that first transaction is complete, the reader integrated in the display card reads the amount of the pending transaction and the card bearer can then validate the transaction by entering the authorisation code. A second contactless transaction may then be carried out by sending back a message that validates the transaction to the telephone, which can then send it to a server of the bank for final recording.

The method thus described is reliable but has the major drawback that the transaction is carried out in three distinct steps. Indeed, two operations are carried out in contactless mode and another one in contact mode with the reader integrated in the card. Due to the exclusion of the concurrent operation of the two types of interface, it is preferable for the operations to be really separate. This type of operation is not fluid for any user, who must manage the starting and stopping of the reader integrated in the card. As a result, it is difficult to deploy such a solution on a large scale.

SUMMARY OF THE INVENTION

The invention proposes to remedy the fluidity problem by automatically sequencing the three operations in a manner that is seamless to the user. To that end, a power management circuit checks the starting up of the reader and the powering of the secure circuit between the two contactless transactions. Further, that allows continuous power supply in the secure circuit of the card, making it possible to carry out the transaction using the RAM memory without resorting to saving in the non-volatile memory.

More particularly, the invention is a payment device comprising a secure integrated circuit, at least one connector, at least one antenna, a reader circuit and an independent battery. The secure integrated circuit has a contactless interface, a contact type interface and a processing circuit, wherein said integrated circuit can be powered by its contact type interface or its contactless interface. The connector is connected to the contact type interface in order to communicate with an external reader. The antenna is connected to the contactless interface, and it is designed to power the secure integrated circuit and communicate with a reader that emits a communication field. The reader circuit is compatible with the secure integrated circuit and includes a display and entry keys, wherein the reader circuit is connected in parallel to the connector. The independent battery is used to power the reader circuit. A power switching circuit is connected to a communication field detection circuit capable of powering the reader circuit after a communication field is detected.

In another aspect, the invention is a method of powering a payment device comprising a secure integrated circuit with a contactless interface, a contact type interface and a processing circuit, wherein the integrated circuit can be powered by its contact type interface or its contactless interface, wherein said device comprises a reader circuit compatible with the secure integrated circuit including a display and entry keys, wherein the reader circuit is connected in parallel to a connector of the contact type interface and is powered by the independent battery. The method consists in powering the reader circuit after a communication field is detected.

BRIEF DESCRIPTION OF THE DRAWINGS

The invention will be better understood through the description below, which refers to the attached drawings, where.

DETAILED DESCRIPTION

Figure 1:
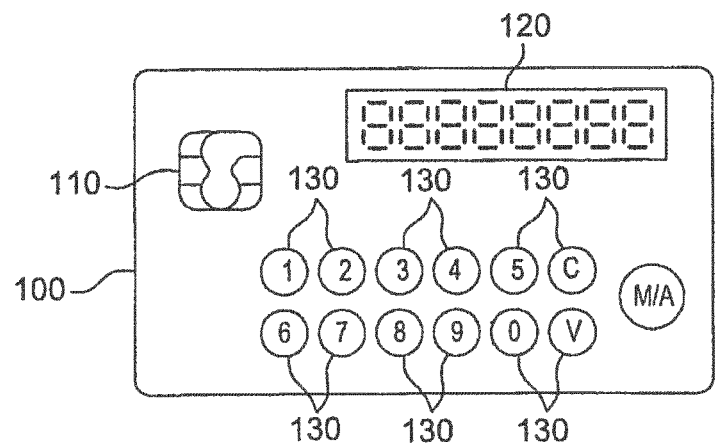
FIG. 1 illustrates a smart card with a display.
Figure 2:
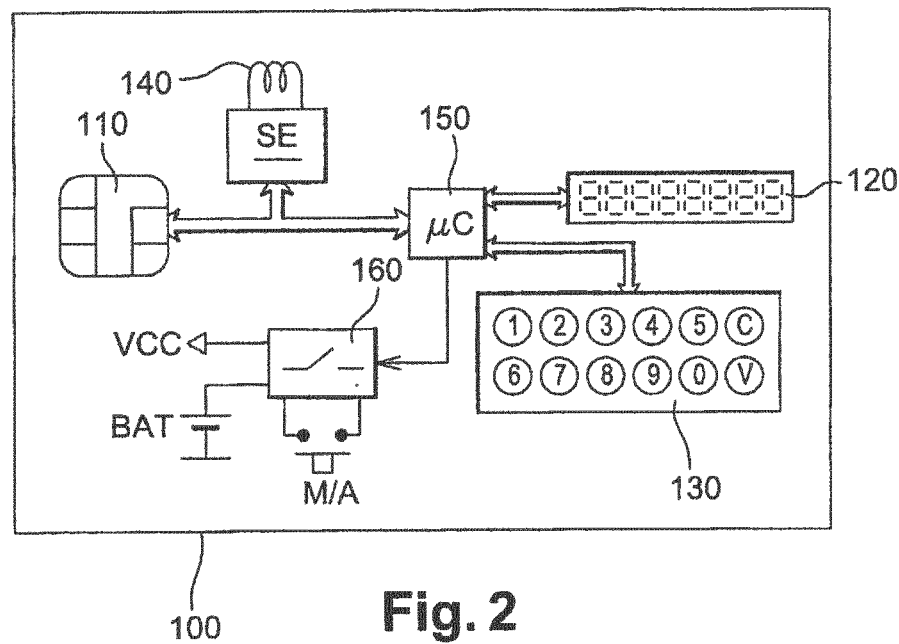
FIG. 2 is a functional diagram of a smart card with a display.

FIGS. 1 and 2 represent a smart card 100 with a connector 110, a display 120, keys forming a keypad 130 and an On/Off button M/A. That smart card 100 comprises a secure integrated circuit SE with a contact type interface connected to the connector 110 and a contactless interface connected to an antenna 140. The display 120 and the keypad 130 are part of a card reader built around a microcontroller type circuit 150, connected to a battery BAT. The On/Off button M/A controls a switching circuit 160 which will supply a power voltage VCC used by the circuits of the reader part of the card.

FIGS. 1 and 2 correspond to a state-of-the-art card, as described, for example, in WO2011/151309. A card of this type makes it possible to display the balance in the account associated with the card, the amount of the latest purchases, the total purchases of the month, and any information present in the card. Authentication is possible by entering the PIN number on the keypad 130 in order to view confidential information or generate a single-use password. With such a card, it is not possible to carry out a sequence made up of a first contactless transaction followed by a second transaction for validating the PIN code via the keypad of the card, and finally a third contactless transaction to validate the first transaction. Indeed, the three transactions must take place successively at a speed determined by the user, who must start the card reader circuit and then switch it off.

Figure 3:
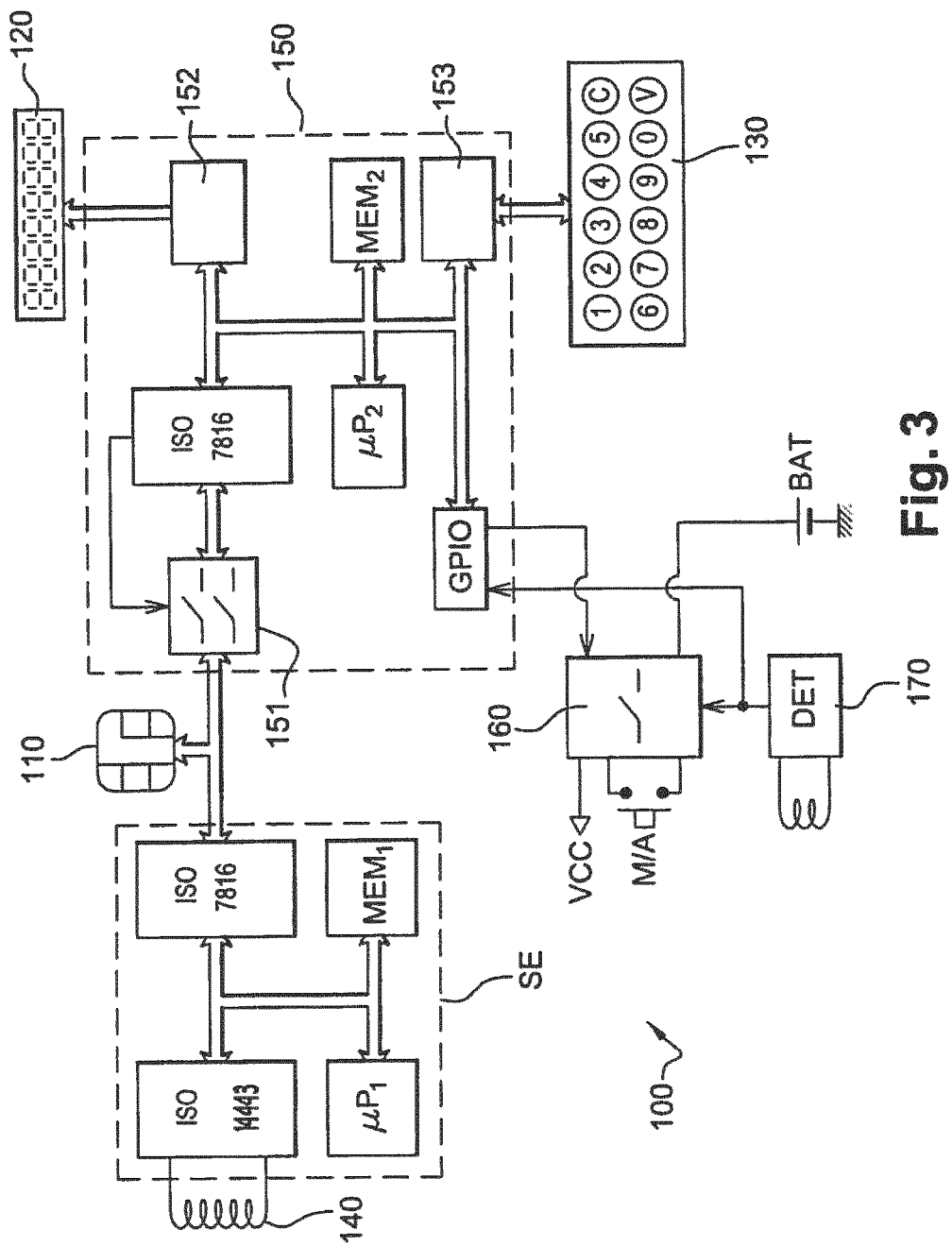
FIG. 3 illustrates a first embodiment of a smart card according to the invention

FIG. 3 illustrates a first embodiment of a payment card 100 according to the invention. In order to better understand the different exchanges, the circuits already disclosed in FIG. 2 must be detailed further, using the same references for the same circuits. As known in the state of the art, the secure integrated circuit SE comprises a microprocessor μP1 collaborating with a memory MEM1, an ISO 7816 interface and an ISO14443 interface. The memory MEM1 is a composite memory which may include at least two different types of memory, out of RAM, ROM, EPROM, EEPROM and Flash. That memory MEM1 comprises the operating system and different applications and the associated data, which are implemented in the microprocessor μP1, which acts as the processing circuit of the secure integrated circuit SE. That memory MEM1 particularly comprises non-volatile registries for storing information that subsists in the absence of power.

The ISO14443 interface is connected to the antenna 140 in order to receive energy from a communication field when the smart card 100 is placed close to a contactless reader. The ISO14443 interface extracts part of the energy of the communication field to power the other circuits making up the secure integrated circuit SE. Further, the ISO14443 interface is also used to demodulate and modulate the communication field to exchange data with the contactless reader that produces the communication field. The ISO7816 interface also receives power voltage to power the secure integrated circuit SE.

The microcontroller 150 comprises an ISO7816 interface connected to the connector 110 via a switch 151 controlled by the ISO7816 interface of the microcontroller. The switch 151 makes it possible to only connect the ISO7816 interface of the microcontroller 150 if the card is not connected to an external reader. The microcontroller 150 further comprises a display interface 152, a memory MEM2, a keypad interface 153, a microprocessor μP2 and input/output ports GPIO. All the components of the microcontroller 150 are connected to the microprocessor μP2 by means of a central bus. The display interface 152 is connected to the display 120. The memory MEM2 is a composite memory which may include at least two different types of memory, out of RAM, ROM, EPROM, EEPROM and Flash. That memory MEM2 comprises an operating system and different applications and the associated data, which are implemented in the microprocessor μP2. The microprocessor μP2 makes up the processing circuit of the integrated reader, wherein its programs are stored in a non-volatile part of the memory MEM2. That memory MEM2 particularly comprises non-volatile registries that make it possible to store information that subsists in the absence of power. The keypad interface 153 is connected to the keypad 130 for its management. A GPIO output port is connected to an input of the switching circuit 160 in order to switch off the power supply. A GPIO input port is connected to an output of a field detector 170.

The output of the field detector 170 is further connected to another input of the communication circuit 160. The field detector comprises an antenna 171 for detecting the presence of a communication field. If a field is present, then the output of the field detector becomes active. When the communication field disappears, the output becomes inactive. Such a detection circuit is in fact a cell of the RLC type, which is self-powered from the communication field.

The communication circuit 160 is connected to the battery BAT and to the On/Off button M/A and supplies the power voltage VCC on one output, which powers the display 120, the keypad 130 and the microcontroller 150, and the connections of which to the different elements have not been represented in order to avoid crowding the drawings. Of course, the ground is common to all circuits, including the secure integrated circuit SE.

Figure 4:
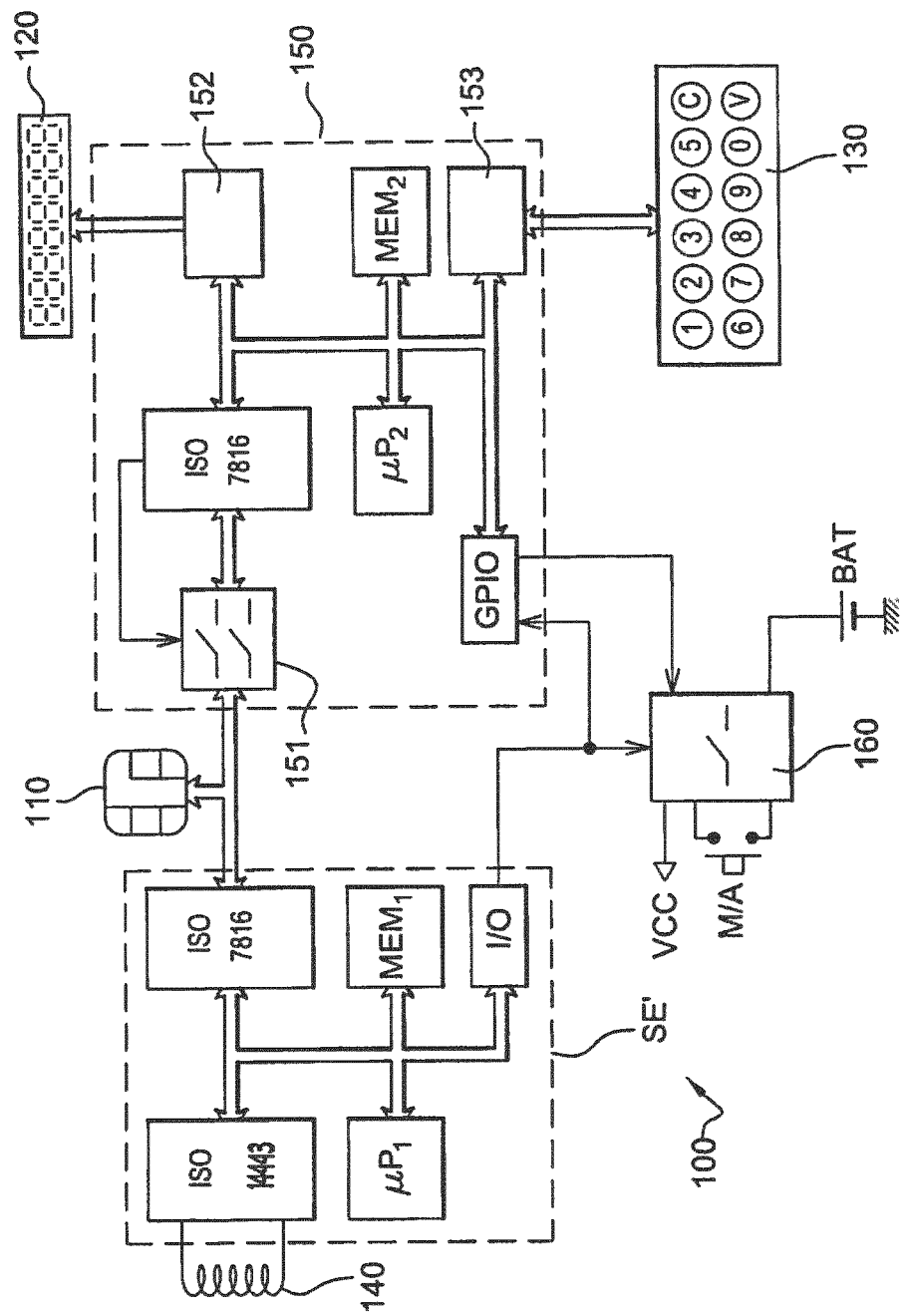
FIG. 4 illustrates a second embodiment of the invention.

The circuit of FIG. 3 is based on a secure integrated circuit SE with no input/output. It is possible to use a secure integrated circuit SE comprising at least one output port I/O as shown in FIG. 4. In that case, the field detector 170 of FIG. 3 may be replaced by the secure integrated circuit SE. Further, the use of the secure integrated circuit as a field detector also offers the benefit of only indicating the presence of a field if such presence must wake up the microcontroller 150.

Figure 5:
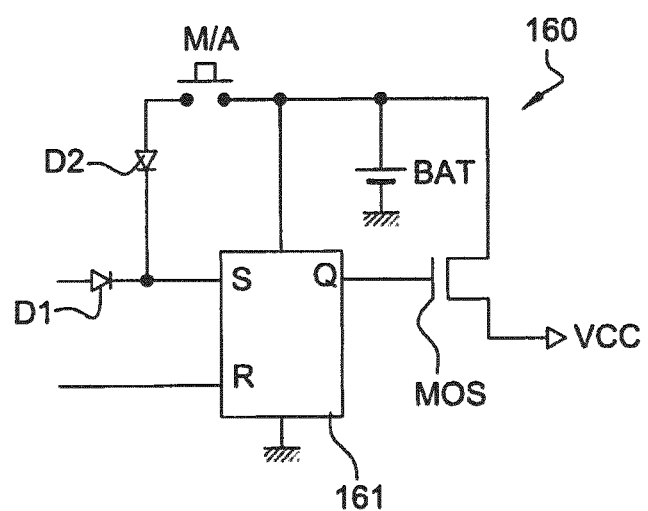
FIG. 5 illustrates an example of embodiment of a power switching circuit.

FIG. 5 illustrates a non-limitative example of embodiment of a switching circuit. A flip-flop 161 makes up the core of the switching circuit 160. That flip-flop 161 is of the SR or Set-Reset type. The Reset input of the flip-flop is connected to the GPIO output port of the microcontroller to receive a deactivation signal that switches the output of the flip-flop 161 to 0. The Set input of the flip-flop 161 is connected by a first diode D1 to the output of the field detector 170 and by a second diode D2 to the On/Off button M/A. If the On/Off button is pressed, then an active level is sent to the Set input and the output of the flip-flop 161 is set to 1. If the output of the field detector supplies an active level, then the output of the flip-flop 161 is also set to 1. The output of the flip-flop is connected to the gate of an MOS transistor, the drain of which is connected to the battery BAT and the source supplies the power voltage.

For secure circuits, there are different modes of managing the two interfaces. The first mode consists in cutting off the ISO14443 interface whenever the power is detected on the ISO7816 interface. That first mode is the most common for secure circuits of bank cards, because it makes it possible to avoid hacking via the contactless interface during a transaction via the contacts. A first operating mode of the circuit of FIG. 3 consists in managing that first mode.

Thus, when the user brings their card close to a contactless reader, the field detector 170 sends an active signal to the switching circuit 160 which starts to supply the power voltage to the microcontroller 150. In order to avoid switching off communication via the ISO14443 interface of the secure integrated circuit SE, the microcontroller 150 delays the activation of the ISO7816 interface and thus the powering of the secure integrated circuit SE.

In one first embodiment, the powering delay may be achieved by identifying the disappearance of the field via the GPIO input port. In a second embodiment, the microcontroller 150 triggers a delay in order to power the secure circuit after a predetermined time after the communication field is detected, wherein the predetermined time is longer than the time required for carrying out a contactless transaction and at the same time is short enough for a user, for example 200 milliseconds.

Further, the use of a delay makes it possible to avoid having to take the card out of the communication field to sequence the transactions.

The secure integrated circuit SE carries out a first contactless transaction and if the transaction requires validation, then validation request information is saved in a non-volatile registry. Preferably, the non-volatile registry is a registry that is supplied when the ISO7816 interface is activated in the first answer message of the card, also known as ATR (Answer-To-Reset).

The microcontroller 150 is programmed as a card reader. At the end of the delay (or after the field disappears), the microcontroller 150 powers the ISO7816 interface of the secure integrated circuit SE and starts a resetting sequence according to standard ISO7816. Upon receipt of the first answer from the card, the microcontroller receives the content of the registry indicating that transaction validation is required. The microcontroller reads the amount of the pending transaction and displays it on the display so that the user can safely check the amount. After pressing a validation key V of the keypad 130, the user enters their PIN number to authorise the transaction. The PIN number is then sent by the microcontroller 150 to the secure integrated circuit SE via a VERIFY PIN command. Then the transaction is validated and the microcontroller re-writes the registry to indicate that the transaction has been validated. The microcontroller 150 can now send a power switch-off signal to the switching circuit 160.

The user can present the card to the contactless reader once again. Upon starting up, the contactless reader reads the registry of the secure integrated circuit SE that indicates that the transaction is validated. The contactless reader asks for a transaction confirmation message. The secure integrated circuit SE can then send an encrypted transaction validation message intended for the remote server. As the presence of the field is detected by the field detector 170, the microcontroller 150 is woken up. Because no transaction is pending, the microcontroller waits for action by the user during a predefined waiting period. In the absence of action by the user during the predefined waiting period, the microcontroller 150 sends a power switch-off signal to the switching circuit 160.

If the user is not satisfied with the transaction, it can be cancelled by pressing the Correction key C of the keypad 130. In that case, the microcontroller 150 rewrites the registry by erasing the transaction validation request. The microcontroller 150 sends a power switch-off signal to the switching circuit 160. At this point, there is no need to bring the card before the contactless reader, except if a transaction is to be re-initiated.

As stated earlier, it is possible to have secure integrated circuits SE that support different modes of managing the ISO7816 and ISO14443 interfaces. In particular, it is possible that the two interfaces operate simultaneously or powering via the ISO7816 interface is possible during a contactless transaction via the ISO14443 interface. The systematic switching off of the power at the end of the ISO7816 transaction is not necessary but makes it possible to save battery power.

As an alternative in accordance with FIG. 4, the detection circuit 170 is replaced by the secure integrated circuit SE. One advantage is that the secure integrated circuit SE is aware of the contactless transaction carried out. Thus, it is not necessary to systematically report the detection of the communication field. In such a case, the output port I/O is activated after the communication field is detected, only if the transaction carried out through the ISO14443 interface is a transaction that requires a PIN number verification.

The invention claimed is:

1. A payment device comprising:
   a secure integrated circuit with a contactless interface, a first contact type interface and a first processing circuit, wherein said integrated circuit can be powered by the first contact type interface or the contactless interface;
   at least one connector connected to the first contact type interface of the secure integrated circuit in order to communicate with an external reader;
   at least one antenna connected to the contactless interface, designed to power the secure integrated circuit and communicate with a reader that emits a communication field;
   a reader circuit connected to the secure integrated circuit and connected to the connector in parallel to the secure integrated circuit, the reader circuit having a second processing circuit, a display, entry keys, a second contact type interface connected to and compatible with the first contact type interface, and a general purpose input port on which the reader circuit receives a signal indicative of presence or absence of a wireless communication field, wherein the reader circuit is adapted to receive, on the general purpose input port, a signal indicative of the presence of a wireless communication field, and is further adapted to provide power over the second contacted interface to the secure integrated circuit after a delay following receiving said signal indicative of the presence of a wireless communication field;
   an independent battery for powering the reader circuit;
   a communication field detection circuitry connected to the general purpose input port of the reader circuit, operable to detect a wireless communication field, and to signal presence of a wireless communication field to the reader circuit over the general purpose input port;
   a power switching circuit, also connected to the communication field detection circuit to receive a signal indicative of detection of a wireless communication field by the communication field detection circuit, and responsive to a signal indicative of detection of a wireless communication field by the communication field detection circuit, closing a first switch between the reader circuit and the independent battery thereby powering the reader circuit from the independent battery after detection of a communication field by the communication field detection circuitry.

2. The device according to claim 1, wherein the secure circuit is said communication field detection circuit and has an output (I/O) connected to the switching circuit to report the detection of a communication field.

3. The device according to claim 1, wherein the communication field detection circuit is an independent circuit of the secure circuit, wherein said detection circuit is connected to the power switching circuit.

4. The device according to claim 1, wherein the reader circuit delays providing power to the secure integrated circuit until after expiration of a predetermined time after the communication field detection circuitry indicates the presence of the communication field is detected.

5. The device according to claim 1, wherein the reader circuit delays providing power to the secure integrated circuit until after the communication field detection circuitry indicates the absence of the communication field.

6. The device according to claim 2, wherein the secure circuit triggers the power switching circuit after the communication field is detected only if the transaction requires PIN number verification.

7. The device according to claim 4, wherein the reader circuit switches off the power to the secure integrated circuit when a communication field is detected.

8. The device according to claim 1, wherein the device has the outer form of a bank card.

9. The device according to claim 1, wherein the fist and the second contact type interfaces comply with the ISO7816 standard.

10. The device according to claim 1, wherein the contactless interface complies with the ISO14443 standard.

11. A method for powering a payment device, comprising:
operating a communication field detection circuitry of the payment device and connected to a reader circuit and to a power switching circuit of the payment device to detect a wireless communication field and to signal presence of a wireless communication field to the reader circuit wherein the payment device comprises:
a secure integrated circuit with a contactless interface, a first contact type interface and a first processing circuit, wherein said integrated circuit can be powered by the first contact type interface or the contactless interface;
at least one connector connected to the first contact type interface of the secure integrated circuit in order to communicate with an external reader;
at least one antenna connected to the contactless interface, designed to power the secure integrated circuit and communicate with a reader that emits a communication field;
the reader circuit, wherein the reader includes a second processing circuit, a display, entry keys, a second contact type interface compatible with the first contact type interface, and a general purpose input port on which the reader circuit receives a signal indicative of presence or absence of a wireless communication field, wherein the reader circuit is connected to the secure integrated circuit and to the connector in parallel to the secure integrated circuit over said second contact type interface, wherein upon receiving, on the general purpose input port, a signal indicative of the presence of a wireless communication field;
an independent battery for powering the reader circuit;
the communication field detection circuitry connected to the general purpose input port of the reader circuit, operable to detect a wireless communication field, and to signal presence of a wireless communication field to the reader circuit over the general purpose input port; and
a power switching circuit, also connected to the communication field detection circuit to receive a signal indicative of detection of a wireless communication field by the communication field detection circuit, and responsive to a signal indicative of detection of a wireless communication field by the communication field detection circuit, closing a switch between the reader circuit and the independent battery thereby powering the reader circuit from the independent battery after detection of a communication field by the communication field detection circuitry;
upon detecting a wireless communication field by the communication field detection circuitry, operating the communication field detection circuitry to transmit a signal to the power switching circuitry indicative of the presence of a communication field;
in response to receiving a signal indicative of the presence of a wireless communication field, closing a switch between the reader circuit and an independent battery thereby powering the reader circuit from the independent battery after a communication field is detected; and
after a delay, operating the reader circuit to provide power over the second contacted interface to the secure integrated circuit.

12. The method according to claim 11, wherein the reader circuit delays providing power to the secure integrated circuit until after a predetermined time after the communication field detection circuitry indicates the presence of the communication field.

13. The method according to claim 11, wherein the reader circuit delays providing power to the secure integrated circuit until after the communication field detection circuitry indicates the absence of the communication field.

14. The method according to claim 11, wherein the secure circuit triggers the power switching circuit after the communication field is detected only if the transaction requires PIN number verification.

15. The method according to claim 12, wherein the reader circuit switches off the power to the secure integrated circuit when a communication field is detected.

16. The device according to claim 5, wherein the reader circuit switches off the power to the secure integrated circuit when a communication field is detected.

17. The device according to claim 6, wherein the reader circuit switches off the power to the secure integrated circuit when a communication field is detected.

18. The method according to claim 13, wherein the reader circuit switches off the power to the secure integrated circuit when a communication field is detected.

19. The method according to claim 14, wherein the reader circuit switches off the power to the secure integrated circuit when a communication field is detected.

20. The payment device of claim 1 wherein the reader circuit further comprises a second switch located between the second contactless interface and the parallel connection to the at least one connector and the first contact type interface wherein second contactless interface controls power supply to the first contact type interface by controlling the second switch in response to the signal indicative of the presence or absence of a wireless communication field.

21. The payment device according to claim 20, wherein the contact type interface of the reader circuit controls the second switch to only connect the reader circuit to the secure integrated circuit over said second contact type interface if no external reader is connected to the at least one connector.

22. The payment device according to claim 1, wherein the reader circuit further comprises a general purpose output port connected to the power switching circuit on which the reader circuit can signal the power switching circuit to switch off power to the reading circuit whereby the reader circuit turns itself off by signalling the power switching circuit to turn off the reader circuit.

23. The payment device according to claim 1, wherein the secure integrated circuit comprises a registry in which during the delay the secure integrated circuit stores a transaction validation request and wherein the reader circuit is programmed to, after the delay, establish a connection to the secure integrated circuitry and read the transaction validation request from the registry, display the transaction on the display, obtain verification from a user via the entry keys, write the transaction validation in the registry, and signal the power switching circuit to turn off power to the reader circuit.

24. The method according to claim 11, wherein the reader circuit further comprises a switch located between the second contactless interface and the parallel connection to the at least one connector and the first contact type interface, wherein the method further comprises operating the second contactless interface to control power supply to the first contact type interface by controlling the switch in response to the signal indicative of the presence or absence of a wireless communication field.

25. The method according to claim 24, wherein the method further comprises operating the contact type interface of the reader circuit to control the second switch to only connect the reader circuit to the secure integrated circuit over said second contact type interface if no external reader is connected to the at least one connector.

26. The method according to claim 11, wherein the reader circuit further comprises a general purpose output port connected to the power switching circuit, the method further comprising operating the reader circuit to signal the power switching circuit over the general purpose output port to switch off power to the reading circuit, and operating the power switching circuit to turn off the reader circuit in response to receiving the signal from the reader circuit.

27. The method according to claim 11, wherein the secure integrated circuit comprises a registry in which during the delay the secure integrated circuit stores a transaction validation request and, the method further comprising operating the reader circuit to, after the delay, establish a connection to the secure integrated circuitry and read the transaction validation request from the registry, display the transaction on the display, obtain verification from a user via the entry keys, write the transaction validation in the registry, and signal the power switching circuit to turn off power to the reader circuit.

\* \* \* \* \*